United States Patent [19]

Milligan

[11] Patent Number: 4,764,347
[45] Date of Patent: Aug. 16, 1988

[54] GRID PLATE ASSEMBLY FOR EBULLATED BED REACTOR

[76] Inventor: John D. Milligan, 650 Prospect Ave., Little Silver, N.J. 07739

[21] Appl. No.: 482,342

[22] Filed: Apr. 5, 1983

[51] Int. Cl.$^4$ ................................................ B01J 8/20
[52] U.S. Cl. ..................................... 422/113; 422/140; 422/143; 422/311
[58] Field of Search ............... 422/113, 143, 311, 140; 34/57 A; 432/15, 58; 431/7, 170; 261/114 A, 114 R

[56] References Cited

U.S. PATENT DOCUMENTS

| | | | |
|---|---|---|---|
| 2,136,139 | 11/1938 | Kahni | 261/114 R |
| 2,578,670 | 12/1951 | Carleton | 261/114 R |
| 2,965,548 | 12/1961 | Hachmuth | 261/114 R |
| 3,256,612 | 6/1966 | Dollinger | 422/143 |
| 3,475,134 | 10/1969 | Weber et al. | 422/143 |
| 3,794,305 | 2/1974 | Kloss | 261/114 A |
| 3,921,663 | 11/1975 | Beranek et al. | 34/57 A |
| 4,090,852 | 5/1978 | Dowd | 422/143 |
| 4,356,082 | 10/1982 | Gross | 502/41 |
| 4,366,140 | 12/1982 | Bujadoux et al. | 423/498 |
| 4,382,901 | 5/1983 | Thomas | 261/114 A |
| 4,427,364 | 1/1984 | Bergduist | 422/143 X |

FOREIGN PATENT DOCUMENTS 940829  7/1982  U.S.S.R. ............................ 422/143

Primary Examiner—Barry S. Richman
Assistant Examiner—William R. Johnson

[57] ABSTRACT

An improved grid plate flow distributor assembly for use in a pressurized catalytic reactor in which gas and liquid materials flow uniformly upwardly through the grid into the reactor ebullated catalyst bed. The grid plate assembly contains multiple vertical flow tubes each covered at its upper end by a cap which is spaced outwardly from the tube upper end and preferably has tapered sides. The cap can have any horizontal cross-sectional shape, such as circular, polygonal, rectangular or triangular. If desired, a horizontal elongated cap can be used which covers at least two adjacent vertical flow tubes. Such elongated caps can be provided as concentric circular shapes above the grid plate. Also, if desired, a thermocouple can be provided extending upwardly above the cap, such as through selected caps to monitor the temperature distribution of the ebullated bed above the grid plate assembly.

12 Claims, 3 Drawing Sheets

4,764,347

GRID PLATE ASSEMBLY FOR EBULLATED BED REACTOR

BACKGROUND OF INVENTION

This invention pertains to an improved grid plate assembly used for providing uniform upward flow distribution in liquid phase ebullated bed catalytic reactors. It pertains particularly to such grid plate assembly which utilizes multiple flow distributor tubes covered at their upper ends by caps which preferably have tapered side walls.

It is known that ebullated bed catalytic reactors operating at elevated temperature and pressure conditions are sometimes subject to flow maldistribution in the catalyst bed. Such flow maldistribution is usually due to abnormal operating conditions such as plugging of openings in the grid plate by coke, or to excessive coke deposits on the catalyst particles in the bed. If such plugging of openings in the grid plate occurs, non-uniform flow distribution and bed ebullation occurs, which is very undesirable. Also, if slumping of the ebullated catalyst bed ever occurs due to any interruption of upward liquid flow from the recycle pump or due to other severe operational upset conditions, difficulty is sometimes encountered with completely re-ebullating the entire catalyst bed.

The use in such ebullated bed catalytic reactors of conventional cylindrical riser tubes covered by cylindrical-shaped bubble caps is disclosed by U.S. Pat. No. 3,197,286 to Farkas et al; U.S. Pat. No. 3,197,288 to Johanson, and U.S. Pat. No. 3,475,134 to Weber et al. However, it has been found that fine catalyst particles together with heavy hydrocarbon liquid fractions under conditions of high temperature can become partially coked and plug these conventional riser conduits. Also such coked catalyst particles can become packed into the spaces between conventional cylindrical-shaped caps having parallel sides, thereby making the uniform re-ebullation of a slumped catalyst bed much more difficult to accomplish. Thus, improvements in ebullated bed reactor flow distribution have been sought. An improved grid plate configuration has been developed which effectively redistributes the gas and liquid flows above the grid plate whenever flow maldistribution problems exist below the grid, facilitates re-ebullation of a slumped catalyst bed, and also provides for monitoring the temperature of the bed above the grid plate to determine that uniform ebullation of the catalyst bed has been established.

SUMMARY OF INVENTION

The present invention provides an improved grid plate assembly for use in liquid phase ebullated bed catalytic reactors for providing uniform fluid flow upwardly through the grid plate into a catalyst bed for performing reactions between gas, liquid and particulate catalyst solids materials, and particularly for the catalytic hydrogenation of hydrocarbon feedstocks at elevated temperature and pressure conditions. The grid plate assembly comprises a grid plate supported within a reactor and sealably attached to the inner wall of the reactor vessel at near the reactor lower end; multiple flow distributor tubes passing substantially vertically through said grid plate, each said tube being cylindrical-shaped; and a cap covering the upper end of at least two adjacent said tubes, said cap being rigidly attached to and spaced outwardly from the tube upper end and above the grid plate, so as to permit flow of liquid and gas upwardly through the flow distributor tubes and then outwardly from under the lower edges of the cap into the ebullated bed. The horizontal cross-sectional shape of the caps can be made circular, polygonal, rectangular or triangular.

The lower edge of the cap preferably contains a plurality of notches which facilitate bubble formation in the upflowing fluid. A single cap can cover at least two vertical flow distributor or riser flow rubes, and furthermore the caps can be horizontally extended to be annular-shaped and arranged in one or more concentric circles above the grid plate. Also, if desired, a thermocouple can be provided extending upwardly through selected caps to a point above the cap, so as to monitor the temperature of the reactor catalyst bed above the cap in each portion of the bed to determine if uniform fluid flow and ebullation of the bed is achieved.

As a further improvement in the cap configuration, the outer surface of the distributor cap is preferably made tapered toward an apex above the cap at an angle of about 5° to 45° with its vertical axis, and the tapered cap can cover one or more riser tubes. Also if desired, the cap skirt portion can have a wavy or undulated shape.

DESCRIPTION OF INVENTION

In liquid phase reactors for contacting liquids, gases and particulate solids, it is very important for achieving complete and effective reactions that the upflowing liquid and gas be uniformly distributed across the horizontal cross-section of the reaction zone, so as to maintain the bed of particulate solids in a uniformly expanded condition with random motion of the particles. For certain reactions, such as the catalytic hydrogenation of heavy oils or coal-oil slurries, or the catalytic hydrocracking of heavy hydrocarbon feedstreams at elevated temperature and pressure conditions of 500°–1000° F. temperature and 500–5000 psig pressure to produce lower-boiling liquid fractions, flow maldistribution through the reactor flow distributor or grid plate assembly can cause relatively inactive zones in the bed where the catalyst is not in uniform random motion. This condition leads to the undesired formation of agglomerates of catalyst particles by coking of the hot oil.

The desired uniform flow distribution upwardly through the grid plate into the ebullated catalyst bed can be impaired either by restrictions occurring in the flow distributor or riser tubes due to coking, or by a buildup of coked catalyst particles between adjacent bubble caps, or by both conditions. The present invention provides an effective solution to both these flow maldistribution problems in the catalyst bed.

The flow distributor or grid plate assembly must also function to prevent catalyst particles from draining downwardly back through the distributor whenever the reactor is shutdown, while most of the liquid contained within the catalyst bed is drained down to below the bed. If catalyst is allowed to drain back through the grid plate flow distributor, it can plug the flow passages therein and interfere so that re-ebullating the catalyst bed following a shutdown becomes very difficult because the flow passages are at least partly restricted. Furthermore, such passage restrictions can produce flow maldistribution in the catalyst bed. To prevent such backflow of catalyst a ball check valve is usually provided in the riser tubes.

When each riser tube is covered with a conventional single cap, plugging of one or more riser tubes in a particular area of the grid plate inactivates the corresponding bubble cap(s). However, in the present invention at least two riser tubes are covered by a single cap, so that relatively uniform flow distribution into the ebullated bed above the grid plate can be achieved despite plugging of some of the riser tubes. It is thus a basic feature of the present invention that the caps preferably cover at least two riser tubes, and usually cover 3-100 riser tubes.

Figure 2:
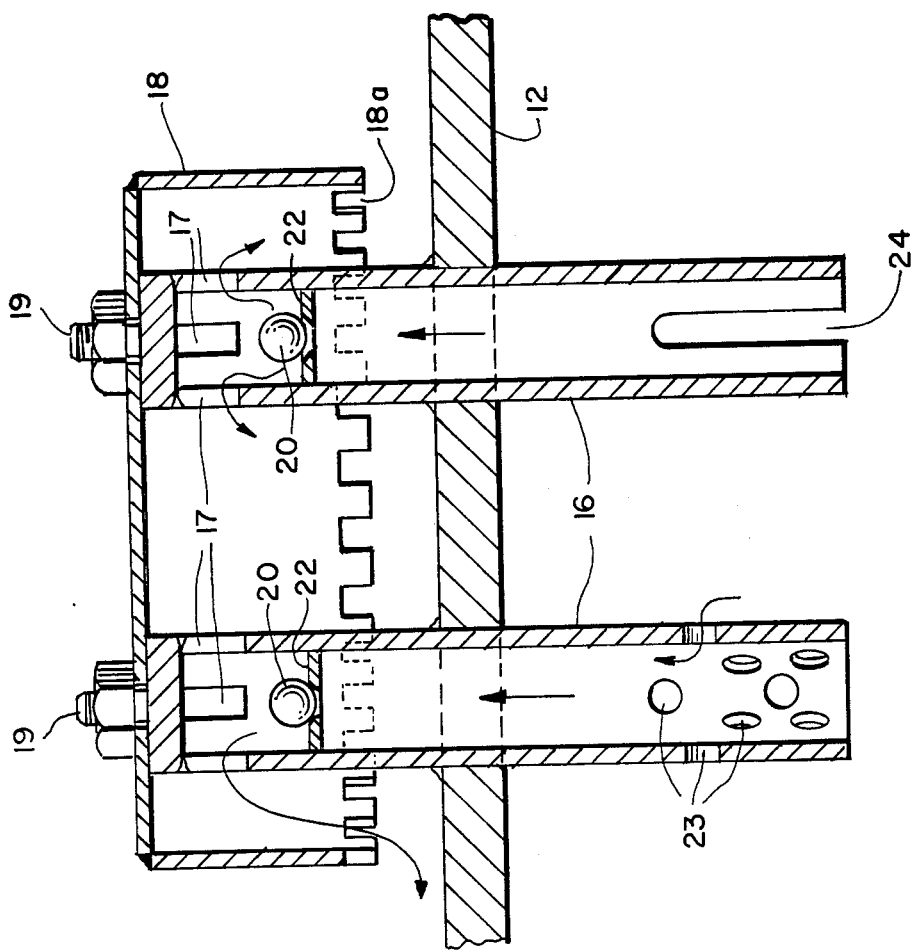
FIG. 2 shows a portion of a grid plate assembly having multiple distributor or riser tubes covered by a single elongated cap.
Figure 1:
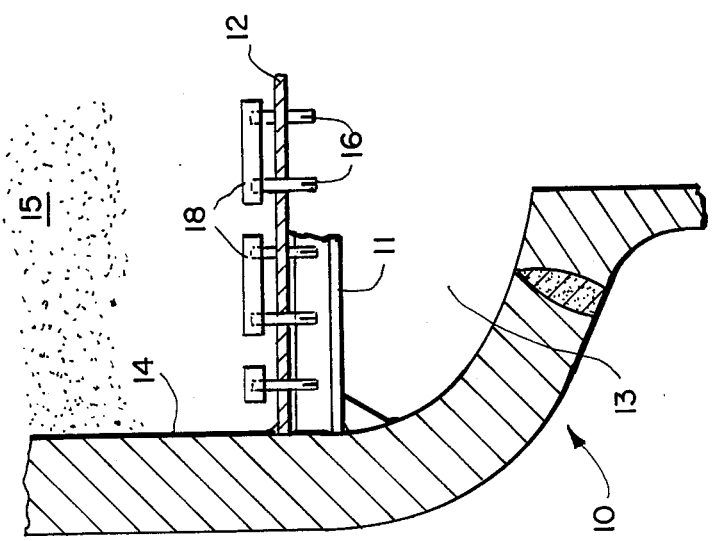
FIG. 1 shows a partial vertical section through the lower portion of a reactor vessel containing a grid plate assembly having multiple flow distributor or riser tubes covered by parallel-sided caps in accordance with one embodiment of the invention.

As generally shown in FIGS. 1 and 2, reactor 10 contains grid plate 12 which is rigidly supported therein such as at its outer edges such as by beams 11 and is sealed to side wall 14 in the lower portion of the reactor, so as to provide a plenum 13 below the grid. The grid plate 12 serves to support catalyst bed 15 and contains multiple flow distributor or riser tubes 16. Each distributor or riser tube 16 has at least one opening or slot 17 at its upper end and is covered by a cap 18, which is rigidly attached to the upper end of tube 16 by fastening means such as threaded bolt and nut 19. The cap is spaced outwardly from tube 16 to provide for uniform flow of fluid upwardly through the tubes in grid plate 12 into the bed 15 of catalyst particles.

The lower edge of the cap 18 is preferably provided with notches 18a to provide for the localized exit flow of gas and promote the formation of small bubbles. The notches 18a around the bottom of the caps can be used with individual caps of any shape, or can be used with an elongated cap covering two or more riser tubes. The notches are intended to let the gas emerge from under the caps as small discrete bubbles instead of large globs of gas, and the notch widths should usually be 5-10 times the catalyst effective particle diameter in bed 15.

Also to prevent backflow of catalyst from bed 15 to plenum 13 below the grid plate 12 upon reactor shutdown, a ball check 20 is usually provided, preferably in the upper end of each riser tube 16, as shown in FIG. 2. The ball check 20 mates with seat 22 provided within the upper end of riser tube 16 to prevent any backflow of catalyst from the bed 15 to the plenum 13 below the distributor plate 12. To facilitate the entry of gas such as hydrogen into the lower end of the riser tube 16, openings such as holes 23 or slots 24 are provided in the tube below the grid plate 12.

Figure 3:
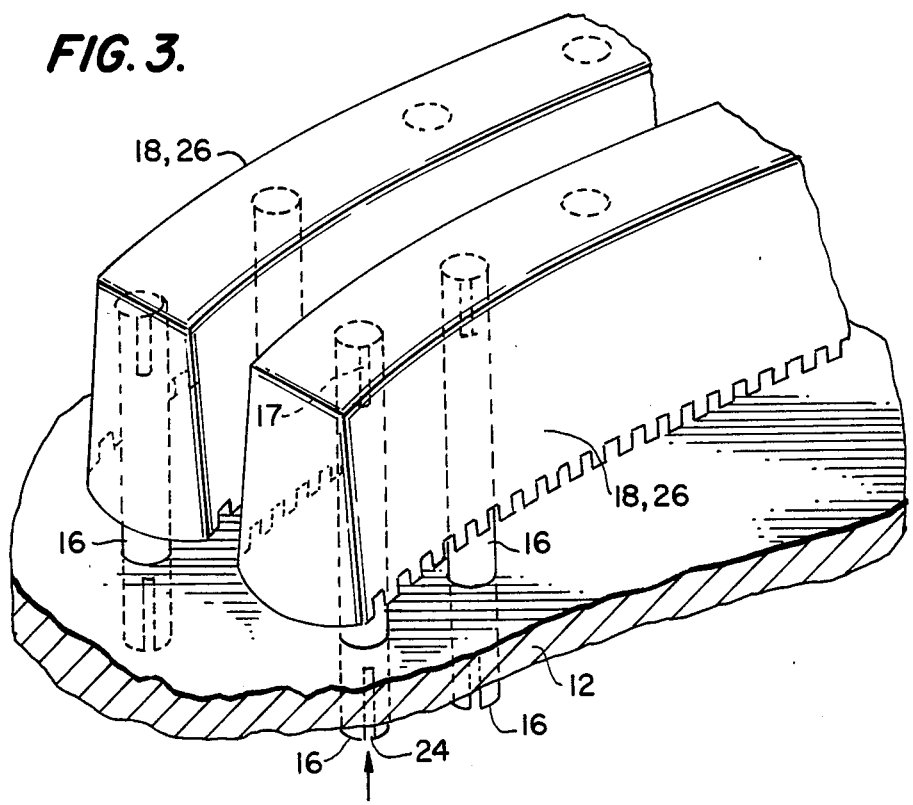
FIG. 3 shows elongated caps having an annular or concentric circular shape with each cap covering multiple riser tubes.

It is an important feature of the invention that each riser tube cap 18 can be not only horizontally extended and made to cover at least two or more riser tubes, but can also be made curved or ring-shaped and provided in substantially concentric circles above the grid plate, as shown in FIG. 3. It is thus an advantage of the present invention that the ring-shaped caps shown in FIG. 3 can be provided for the lateral redistribution of fluid flow within the cap and thereby tends to correct any flow maldistribution above the grid plate 12 which may be caused by flow maldistribution problems on the underside of the grid, by allowing for lateral fluid flow in the ring shaped caps to aid in the removal of any local blockages. Any plugging problems occurring in the ring shaped caps should be more or less annular, which would aid in maintaining good ebullation of the catalyst bed. Bed ebullation will be more or less symmetrical even though some riser tubes 16 might become plugged. Also, the generally annular shape of the ring cap permits a more uniform flow distribution near the inner wall of the reactor, as the presently used triangular pattern for locating riser tubes and caps in the grid plate does not lend itself to uniform flow distribution at the reactor walls. It is also understood that the annular caps 18 shown in FIG. 3 need not necessarily form a complete circle, as segments of annular caps covering multiple risers can also be advantageously utilized.

Figure 4:
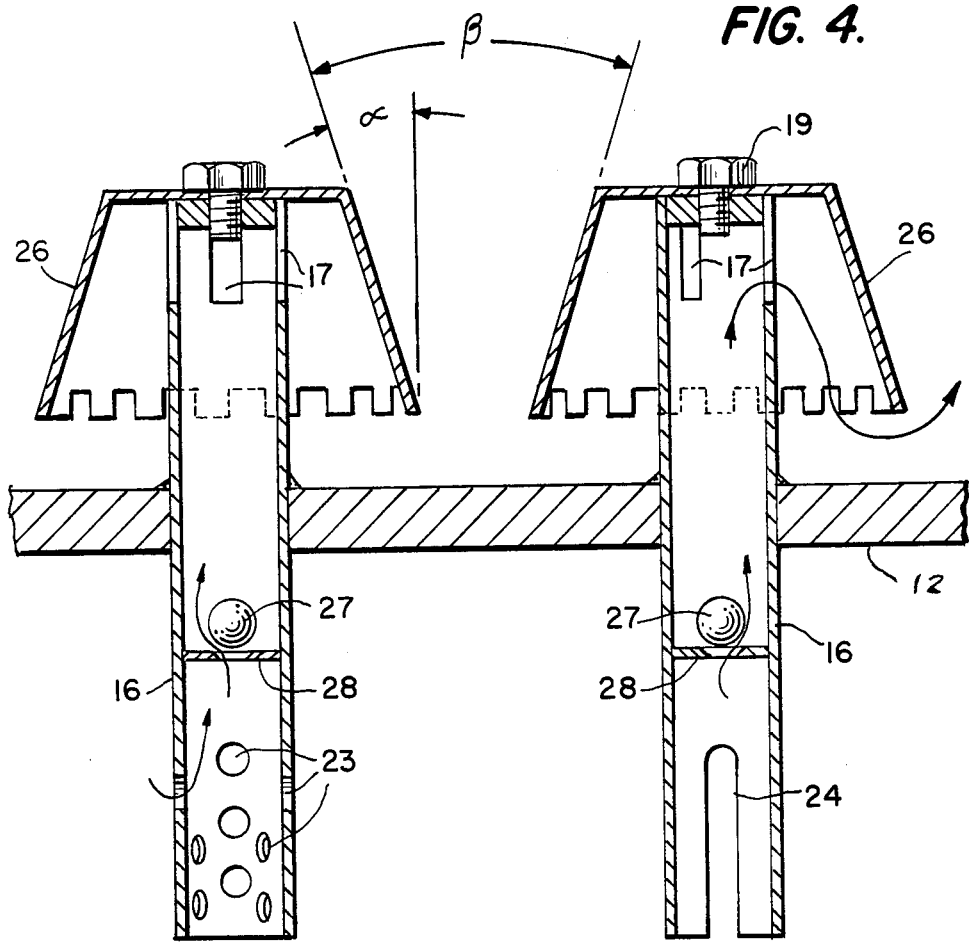
FIG. 4 shows a tapered cap and tube assembly having various tapered shape caps each covering a single riser tube.

It is another important feature of the invention that the caps covering one or more riser tubes are each preferably made tapered so as to avoid plugging between adjacent caps by catalyst particles and thereby facilitate the reebullation of the catalyst bed 15 should any slumping of the bed ever occur. As shown in FIG. 4, the caps preferably have their side walls 26 tapered at an angle $\alpha$ at least about 5° and up to about 45° with their vertical axis or centerline, so as to provide an included angle $\beta$ of 10°-90° between adjacent caps and thereby provide greater spacing between the adjacent caps 26 at their upper ends than at their lower ends. The cross-sectional shape of the tapered caps as is typically shown in FIG. 4 can be made circular, polygonal, rectangular or triangular. The spacing between adjacent riser tubes 16 should be at least about 2 times the tube inside diameter, and usually should not exceed about 10 times the tube diameter. Also, a ball check 27 and seat 28 can be provided within each riser tube 16 to prevent backflow of catalyst particles.

Figure 6:
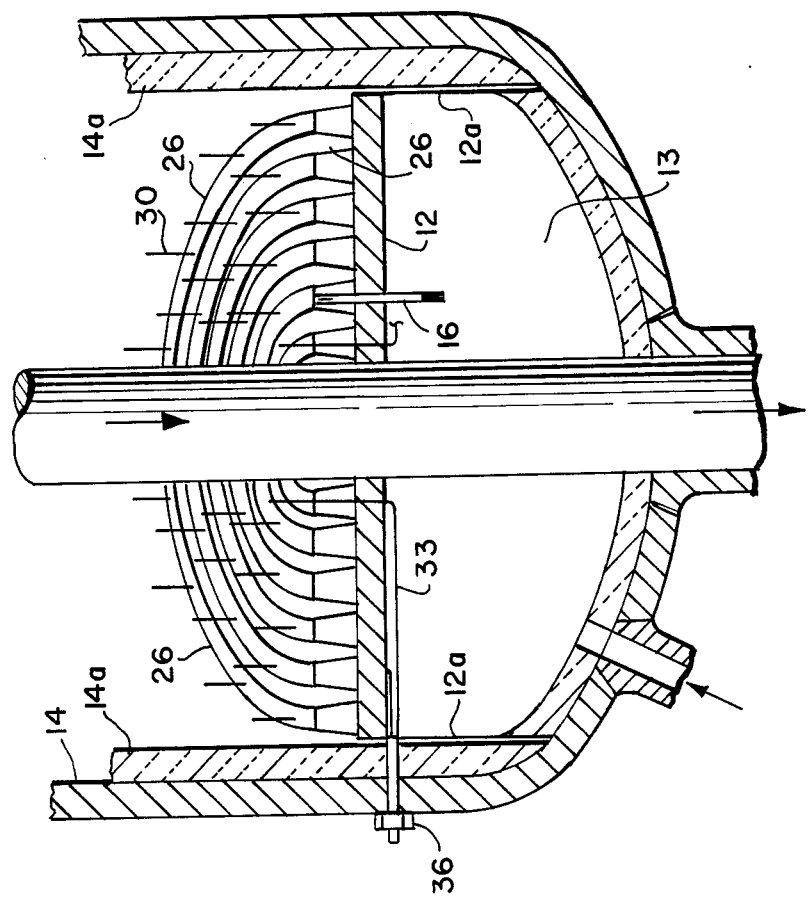
FIG. 6 shows a partial sectional view of a grid plate assembly including concentric circular-shaped tapered caps having multiple spaced thermocouples extending above the caps.

The tapered caps 26 shown in FIGS. 4 and 6 are less prone to plugging the zone betwen adjacent caps with compacted catalyst particles than are the parallel-sided caps 18, so that re-ebullating a slumped catalyst bed is thereby facilitated. Also, the tapered cap which helps to eliminate plugging on reactor restart following a slumped catalyst bed, also aids in attaining a "log-jamming" effect of the catalyst if the catalyst bed slumps and thus aids in stopping any undesired back-flow of catalyst downwardly through the grid plate tubes. It will be apparent that the caps horizontally extended to cover at least two riser conduits as per FIG. 2 can also be provided with tapered side walls, similarly as shown in FIG. 4.

Although the tapered caps shown in FIG. 4 have the lower edge formed to make a circular or annular-shaped cap, it is also realized that this cap lower edge can be formed to any of many configurations so as to attain a longer edge, i.e., by providing a scalloped or undulated shape surface while still maintaining the general taper of the ring cap side walls 26.

Figure 5:
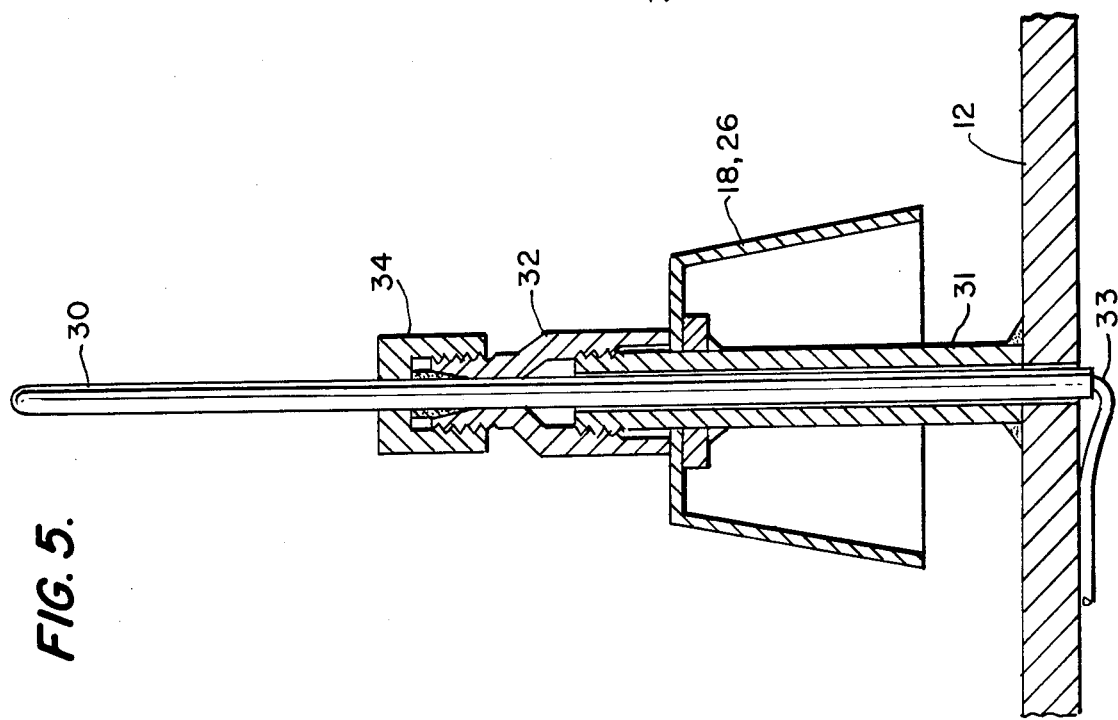
FIG. 5 shows a cap assembly having a thermocouple extending above the cap.

It is an additional feature of the present invention that a thermocouple assembly can be provided with selected cap assemblies within the reactor, as shown in FIG. 5 for monitoring the ebullated catalyst bed temperature at various locations. This thermocouple assembly can be used with either conventional individual caps, horizontally extended caps or with individual tapered caps. The thermocouple tube 30 extends above the upper surface of cap 18 and is attached to the cap and support post 31 by a threaded sleeve 32 and compression fitting nut 34. The thermocouple assembly is used to monitor reactor catalyst bed ebullation and in ascertaining whether or not the entire cross-section of the catalyst bed above the grid plate is active, i.e, has upward flow of gas and liquid through the risers and caps which provides for uniform bed temperature. The bed ebullation monitoring system usually consists of one thermocouple assembly for each approximately 2–4 square feet of grid plate area, i.e. a reactor having 10 foot inside diameter would use 20–40 thermocouples. In a typical reactor assembly arrangement, the thermocouple wires 33 from each approximately ten thermocouples can usually be conveniently bundled together and led through the reactor wall by a suitable high-pressure connection 36, such as a compressor type connector, located in each quadrant of the reactor as shown in FIG. 6. Also for FIG. 6, the reactor has thermal insulation 14a provided within wall 14 and the grid plate 12 is supported from the reactor lower head by a support skirt 12a.

Although this invention has been described broadly and in terms of certain preferred embodiments, it will be understood that modifications and variations to the apparatus can be made and that some features can be used without others are within the spirit and scope of the invention, which is defined by the following claims.

I claim:

1. An improved grid plate assembly for an ebullated bed reactor for providing uniform fluid flow upwardly into the ebullated bed for performing reactions between gas, liquid and particulate solids material therein, comprising:
   (a) a reactor vessel having a lower end with a grid plate supported within said reactor vessel and sealably attached to an inner wall of the reactor vessel near the reactor lower end;
   (b) multiple flow distributor tubes passing substantially vertically through said grid plate, each said tube being generally cylindrical shaped and having a ball check located in an upper portion of the tube to prevent backflow of particulate solids to below the grid plate; and
   (c) a plurality of caps with each cap covering the upper end of at least two adjacent said tubes, each said cap being rigidly attached to and spaced outwardly from the tube upper end and above the grid plate and having side walls tapered at an angle from about 5° to about 45° with its vertical axis, so as to permit flow of fluid uniformly upwardly through the distributor tubes and then outwardly from under the lower edges of the cap into the ebullated bed of particulate solids.

2. The grid plate assembly of claim 1, wherein each said cap contains a plurality of notches located around the cap lower edge.

3. The grid plate assembly of claim 1, wherein said plurality of caps are annularly arranged in at least one circle concentric with the reactor inner wall.

4. The grid plate assembly of claim 1, wherein said cap has a thermocouple extending through the cap upwardly to a point above the cap to monitor the temperature of the reactor ebullated bed at a point adjacent to the cap.

5. The grid plate assembly of claim 1, wherein each said cap has a plurality of notches located around the cap lower edge, each cap being annular-shaped and with the plurality of said caps being arranged in multiple concentric circles above the grid plate.

6. An improved grid plate assembly of claim 1, wherein said each cap has a plurality of notches provided around its lower edge, and a thermocouple is provided extending through said cap to terminate above the cap, one said thermocouple being provided for each 2–4 square feet of reactor cross-sectional area, so as to monitor the temperature of the reactor ebullated bed above the grid plate to determine uniformity of bed ebullation.

7. The grid plate assembly of claim 1, wherein said cap has a lower edge having an undulated shape.

8. An improved grid plate assembly for an ebullated bed catalytic reactor for providing uniform flow upwardly from a plenum into a catalyst bed for performing reactions between gas, liquid, and particulate solid catalyst materials therein, said assembly comprising:
   (a) a reactor vessel having a lower end with a grid plate supported within said reactor vessel and sealably attached at its outer edges to an inner wall of the reactor vessel near the vessel lower end;
   (b) multiple flow distributor tubes passing substantially vertically through said grid plate, each said tube being substantially cylindrical shaped, and having a ball check located in an upper portion of the tube to prevent backflow of catalyst particles to below the grid plate; and
   (c) a plurality of caps with each cap covering the upper end of at least two adjacent said tubes, each said cap being rigidly attached to the upper end of each said tube and spaced outwardly therefrom and above the grid plate, and having a plurality of notches around the cap lower edge, said cap having side walls tapered at an angle of about 5° to 45° with its vertical axis and; being annular-shaped and said plurality of caps being arranged in at least one circle concentric with the reactor wall above the grid plate, so as to permit flow of gas and liquid uniformly upwardly from the reactor plenum through the flow distributor tubes and then ourwardly from under the lower edges of the cap, and into the ebullated bed of particulate solids.

9. The grid plate assembly of claim 8, wherein said cap has a cross-sectional shape which is circular, polygonal, rectangular or triangular.

10. The grid plate assembly of claim 8, wherein a thermocouple assembly is provided extending through selected said caps to terminate above the cap so as to monitor the temperature of the reactor ebullated bed, one said thermocouple assembly being provided for each 2–4 square feet of grid plate cross-sectional area.

11. An improved grid plate assembly for an ebullated bed catalytic reactor for providing uniform flow upwardly into a catalyst bed for performing reactions between gas, liquid, and particulate solid catalyst materials therein, said assembly comprising:
   (a) a reactor vessel having a lower end with a grid plate supported within said reactor vessel and sealably attached at its outer edges to an inner wall of the reactor vessel near the reactor vessel lower end;

(b) multiple flow distributor tubes passing substantially vertically through said grid plate, each said tube being substantially cylindrical shaped and having a ball check located therein;

(c) a plurality of tapered caps with each tapered cap covering the upper end of at least two adjacent said tubes, each said cap being annular shaped and rigidly attached to the upper end of each said tube and spaced outwardly therefrom and above the grid plate, the cap side walls being tapered at an angle of 5°–45° with its vertical axis, and having a plurality of notches located around its lower edge, so as to permit flow of gas and liqud upwardly through the tube and then outwardly from under the lower edges of the cap; and (d) at least one thermocouple assembly extending through said grid plate and one of the plurality of said caps to terminate above the cap, so as to monitor the temperature and uniformity of the reactor ebullated bed above the cap.

12. The grid plate assembly of claim 11, wherein said caps are annular-shaped and are arranged in concentric circles above the grid plate.

* * * * *